United States Patent Office 3,641,076
Patented Feb. 8, 1972

3,641,076
CATALYST RECOVERY
Frank B. Booth, Placentia, Calif., assignor to Union Oil Company of California, Los Angeles, Calif.
No Drawing. Continuation of application Ser. No. 729,886, May 17, 1968. This application Aug. 24, 1970, Ser. No. 66,562
Int. Cl. C07f 15/00, 15/02, 15/04
U.S. Cl. 260—429 R                                21 Claims

ABSTRACT OF THE DISCLOSURE

A method for the recovery of complexes of Group VIII metals and biphyllic ligands from hydrocarbons or high boiling residues formed in hydrocarbonylation of olefins. The Group VIII catalyst metal is recovered in accordance by treatment of the high boiling fraction of a hydroformylation reaction medium with a solution of sulfuric, perchloric or low molecular weight alkyl or aryl sulfonic acids at a temperature from about 5° to 125° C. and a pressure from about 1 to 1000 atmospheres, sufficient to maintain liquid phase conditions during the contacting. The presence of a hydrocarbon olefin having from 2 to about 25 carbons in the extraction step enhances the extraction of the Group VIII metal catalyst complex. The Group VIII metal complex can be precipitated from the acid extract phase by dilution with water to lower the acid strength of the extract.

This application is a continuation of application Ser. No. 729,886, filed May 17, 1968 and now abandoned.

DESCRIPTION OF THE INVENTION

The invention relates to a method for the recovery of Group VIII metal values from organic solvents. The invention further relates to the recovery of the complexes of Group VIII metals with trihydrocarbyl ligands from non-polar organic solvents and, in a specific embodiment, relates to the treatment of a portion of the reaction medium used in the hydroformylation of olefins to carbonyls to recover the catalyst therefrom prior to discard of a portion of the reaction medium containing the tarry and high boiling byproducts formed during the reaction.

Recent advances in homogeneous catalysis have included the preparation and use of soluble complexes of Group VIII metals and biphyllic ligands such as the trihydrocarbyl phosphines, phosphites, stibines, arsines and bismuthines. These complexes are useful for a variety of reactions such as hydrogenation of carbonyls, olefins, aromatics, etc.; hydroformylation of olefinic substrates to carbonyls and alcohols and the hydrocarboxylation of olefins to carboxylic acids. Processes based on the use of these homogeneous catalysts unavoidably encounter the formation of high boiling byproducts of the reaction, e.g., tars and high boiling aldol condensation products in hydroformylation or hydrogenation of carbonyls; dimers or oligomers formed during hydrogenation of olefinic substrates, etc.

The commercial adoption of the aforementioned hydroformylation requires the removal and discard of a portion of the reaction medium to avoid excessive accumulation of the high boiling products; however, the expense of the aforementioned highly active catalyst prohibits its discard. Accordingly, it is desirable that a method be devised for the economical recovery of the homogeneous Group VIII metal-trihydrocarbyl ligand complexes. Such a method is particularly needed in combination with the Group VIII noble metal catalysis where the high cost of the noble metals necessitates almost complete recovery of the catalyst prior to discarding of the high boiling and tarry constituents.

It is an object of this invention to provide a method for the recovery of Group VIII metal values from non-polar organic solvents.

It is a further object of this invention to provide a method for the recovery of Group VIII metal complexes of biphyllic ligands.

It is a further object of this invention to provide a method for the recovery of complexes of Group VIII metals and trihydrocarbyl ligands employed in hydrogenation or hydroformylation reactions.

It is an additional object of this invention to provide a method for the recovery of Group VIII metal complexes of trihydrocarbyl ligands from polar solvents containing tars and high boiling byproducts.

It is a further object of this invention to provide a method for the recovery of the catalyst values as a step in a comprehensive method to remove tar and high boiling byproducts from a hydroformylation reaction using a Group VIII metal-trihydrocarbyl ligand complex.

I have now found that a Group VIII metal can be substantially completely recovered from an organic non-polar solvent or from a hydroformylation reaction residue where the Group VIII metal exists as a soluble complex with a biphyllic ligand by extraction with a solution of a strong acid. Preferably the extraction is performed in the presence of a hydrocarbon olefin having from 2 to about 25 carbons. The extraction can be performed at ambient conditions including temperatures from about 0° to about 125° C. and pressures from about 1 to 1000 atmospheres, sufficient at the extraction temperature to maintain liquid phase conditions during said contacting. The metal complex is extracted into the acid phase and separation of the two phases provides an extract phase rich in the Group VIII metal complex. The metal complex can thereafter be recovered from the acid phase by dilution of the acid phase which precipitates the complex from the acid phase. Preferably, the dilution is performed in the presence of a non-polar solvent which dissolves the complex.

The metal complex apparently functions as a weak base and is protonated by the strong acid during extraction. The protonated complex is highly soluble in the acidic extract phase and insoluble in non-polar media so that essentially complete extraction can be achieved. The catalyst is frequently used in reaction media having excess biphyllic ligand. The excess quantity of ligand enhances the extraction of the catalyst and, accordingly, such media are preferred for treatment according to this invention. Since the ligands are also weak bases, the strong aqueous acid also extracts any excess biphyllic ligand that is present in the non-polar media subjected to treatment.

The metal complex can be precipitated from the acid extract by dilution of the acid phase with water. Acids dissolved in water or in extract solvents hereinafter described can be diluted by the addition of water thereto and the dilution of the acid reduces the acid strength to a point where the complex and excess ligand, if present, apparently deprotonate and thus become insoluble in the acid phase. Preferably the dilution is performed in the presence of a non-polar solvent which thereby dissolves or extracts the complex and ligand from the diluted acid phase. When a hydroformulation reaction solvent is used, the complex can be extracted into the non-polar solvent phase for recycling to the hydroformylation reaction zone.

The extraction can be performed on a hydrocarbon solution of the Group VIII metal-biphyllic ligand complex with any of the hydrocarbon solvents hereafter mentioned. The invention thus employed serves as a purification step for the complex. The most useful application of the invention is for the selective extraction of Group VIII metal-biphyllic ligand complexes from hydroformylation residues containing high boiling residues and byproducts. Of particular value is the application to recovery of the Group VIII noble metal catalyst values from such residues because of the high value of such metal values.

The process of hydrocarbonylation wherein my invention affords the greatest value is that described in copending applications Ser. Nos. 518,562 and 642,191. The process comprises contacting an olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst described is a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst described is a Group VIII noble metal hydride complex with carbon monoxide and a biphyllic ligand.

The biphyllic ligands are organic compounds capable of forming a complex with the catalyst by coordinate covalent bonding and have one atom with an unshared pair of electrons for such bonding. These can be compounds of trivalent phosphorus, antimony, arsenic and bismuth. Typically, the biphyllic ligand is an aromatic phosphine such as triphenylphosphine.

During hydroformylation there occurs a slight but continuous accumulation of high boiling byproducts and tar which remain in the bottoms from the distillation zone used to recover the products. These are recycled to the reaction zone with the bottoms stream which also contains the catalyst. In accordance with my invention all or a portion of this liquid residue fraction is contacted with the strong acid solution which is effective in the selective extraction of the catalyst from the liquid residue. The extract phase resulting from this contacting is separated from the liquid residue which contains the tar and high boiling byproducts and which can suitably be discarded.

The extract phase can thereafter be treated to recover the catalyst for returning to the reaction zone and this can simply be effected by precipitation of the catalyst by dilution of the extract phase to reduce the acid concentration therein. Surprisingly, I have found that this treatment effects substantially complete recovery of the catalyst from the reaction medium prior to its discarding. Complete recovery of the catalyst from the acidic extract phase can be achieved. The treatment does not destroy the complex catalyst composition or impair its activity when it is subsequently employed in the hydrocarbonylation reaction.

Strong acids are necessary to effect the extraction of the weakly basic complex. Suitable acids include perchloric acid, sulfuric acid, alkylsulfonic acids having from 1 to about 6 carbons, cycloalkylsulfonic acids having from 5 to about 8 carbons, and monocyclic arylsulfonic acids having from 6 to about 10 carbons. Examples of the sulfonic acids include ethanesulfonic, isopropanesulfonic, butanesulfonic, pentanesulfonic, 2-ethyl-hexanesulfonic, cyclohexanesulfonic, cyclopentanesulfonic, methlycyclopentanesulfonic, cycloheptanesulfonic, benzenesulfonic, xylenesulfonic, cumenesulfonic, ethylbenzenesulfonic, pseudocumenesulfonic, p-isobutylbenzenesulfonic acids, etc.

The acid should be present in the extract phase at a sufficient concentration to effect the extraction. This concentration is generally 5 weight percent or greater and can readily be determined by admixing the particular acid solution under investigation for use as an extractant with a toluene or other hydrocarbon solution containing dissolved quantities of the metal complex. Solutions of the metal complexes are colored and the decoloring of the toluene solution can be observed as the criterion for determination of the acid strength, i.e., the acid solution should be of sufficient concentration so that when admixed with a toluene solution of the metal complex, the acid solution will decolor the toluene solution. As previously mentioned, such acid concentrations are about 5 to 100 weight percent. When water is used as the solvent the acid concentration is from 20 to about 100 weight percent; and preferably about 60 to 75 weight percent. When organic acid solvents hereafter described are used, the acid concentration is from about 5 to about 100 and preferably from 7 to about 35 weight percent. The acid, when used with organic solvents should be employed in sufficient concentration, within the aforementioned limits, to form an immiscible phase with the solution containing the catalyst complex and, as with the aqueous solutions, to effect decolorization of a toluene solution of the catalyst complex.

The metal values are extracted from the high boiling hydroformylation byproducts. To reduce the volume of material to be treated, I prefer to evaporate all volatilizable components from the reaction medium by vacuum distillation at temperatures from 95° to 225° C. at a pressure from 1 to 250 millimeters mercury. When the resulting vacuum residue is too viscous for facile extraction it can be diluted with a suitable inert solvent. Preferably, a non-polar organic solvent is used to dilute the residue. Examples of suitable non-polar solvents include the aromatic, aliphatic or alicyclic hydrocarbons.

Examples of the aforementioned hydrocarbons that can also be employed as hydroformylation reaction solvents include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, decalin, indane, etc.

ACID SOLVENTS

Solvents which are suitable for forming the extract phase with the aforementioned strong acids include organic liquids which are inert to the acid, catalyst and high boiling reaction residue and which have sufficient solvency for the acid. These solvents include alkyl ethers, carboxylic acids, amides and alkyl esters of carboxylic acids and dialkyl sulfoxides.

Ethers which can be employed include the $C_1$–$C_6$ alkyl ethers of $C_1$–$C_6$ alkanols and glycols such as diisopropyl ether, di-n-butyl ether, ethylene glycol dibutyl ether, diisoamyl ether, methylhexyl ether, methylamyl ether, dichloroethyl ether, ethylene glycol diisoamyl ether, diethylene glycol diethyl ether, ethyl isopropyl ether, diethylene glycol, diethyl ether, diethylene glycol dimethyl ether, ethylene glycol dibutyl ether, ethylene glycol diamyl ether, triethylene glycol diethyl ether, diethylene glycol di-n-hexyl ether, tetraethylene glycol dimethyl ether, tetraethylene glycol dibutyl ether, etc.

Carboxylic acids that can be used include the hydrocarbon alkanoic acids having from 2 to about 12 carbons such as acetic, propionic, butyric, valeric, pivalic, caproic, caprylic, decanoic, lauric, etc. Preferred acids are those containing from 2 to about 5 carbons.

The esters of formic acid and the aforementioned hydrocarbon alkanoic acids and alaknols and alkanediols having from 1 to about 10 carbons can also be used as solvents. Examples of this class of solvents include ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethylene glycol diacetate, glycol butyrate, isoamyl n-butyrate, isoamyl isovalerate, etc. A preferred class of ester solvents includes the lactones, e.g., butyrolactone, valerolactone and their derivatives having lower ($C_1$–$C_5$) alkyl substituents.

The amides of formic acid and the aforementioned hydrocarbon alkanoic acids can also be used as solvents. Examples include the simple amides as well as the N-alkyl and N,N-dialkyl substituted amides, e.g., dimethyl formamide, N-methylacetamide, N-amylpropionamide, N,N-dimethylbutyramide, N-methylvaleramide, N-isopropylhexanoic amide, N,N-dimethyl heptanoic amide, octanoic amide, N-methyl nonanoic amide, decanoic amide, etc.

Alkyl sulfoxides can also be used as the strong acid solvent and suitable examples include those with $C_1$ to $C_{10}$ alkyl groups such as dimethyl sulfoxide, diethyl sulfoxide, diisopropyl sulfoxide, diamylsulfoxide, methyldecyl sulfoxide, ethylnonoyl sulfoxide, isopropylhexyl sulfoxide, ethylhexylsulfoxides, etc.

HYDROFORMYLATION SOLVENTS

The aforementioned solvents can also be used as the solvents for the hydroformylation reaction. Hydrocarbons are the preferred solvent for this reaction, particularly the aromatic hydrocarbons; however, any of the amides, esters, sulfoxides, esters or ethers aforementioned can also be used. In addition, other solvents which are also inert to the catalyst and reactants under the hydroformylation conditions such as ketones, aldehydes and alcohols can be used for the hydroformylation solvent if desired. With the preferred processing, i.e., vacuum evaporation to reduce the volume of residue for extraction, these solvents are removed from the residue prior to extraction.

Examples of various alkyl and aryl ketones which can be employed as the hydroformylation reaction solvent include, e.g., acetone, methylethyl ketone, diethyl ketone, diisopropyl ketone, ethyl-n-butyl ketone, methyl-n-amyl ketone, cyclohexanone, diisobutyl ketone, etc.

Alcohols can also be employed as hydroformylation reaction solvents. Preferably tertiary alcohols are employed since these materials are substantially non-reactive under the hydrocarbonylation conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

Also useful as solvents for the hydroformylation reaction are the aldehyde products of the carbonylation. These products are surprisingly inert and resist aldol condensation and hydrogenation under the hydroformylation conditions. Accordingly, aldehydes such as propionaldehyde, butyraldehyde, valeric, hexanoic, heptenoic, caproic, decanoic aldehydes, etc., can be employed as the reaction medium.

GROUP VIII METAL

The Group VIII metal is present in the aforementioned organic solvents as a metal hydride or salt, typically a halide, in complex association with carbon monoxide and a biphyllic ligand. There can also be incorporated in the reaction solution a polycyclic, heterocyclic amine having a nitrogen in at least one bridgehead position. Examples of Group VIII metal hydrides, carbonyls or salts include those which are commercially available. Examples of suitable sources of the metal values are as follows: bis(triphenylphosphine)iridium carbonyl chloride; tris(triphenylphosphine)iridium carbonyl hydride; iridium carbonyl; iridium tetrabromide; iridium tribromide; iridium trifluoride; iridium trichloride; osmium trichloride; chloroosmic acid; palladium hydride; palladous chloride; palladous cyanide; palladous iodide; palladous nitrate; platinic acid; platinous iodide; palladium cyanide; sodium hexachloroplatinate; potassium trichloro(ethylene) platinate (II); chloropentaaminohodium (III) chloride; rhodium dicarbonyl chloride dimer; rhodium nitrate; rhodium trichloride; tris(triphenylphosphine)rhodium carbonyl hydride; tris(triphenylphosphine)rhodium (I) chloride; ruthenium trichloride; tetraaminorutheniumhydroxychloro chloride, etc. Suitable salts of other Group VIII metals include cobalt chloride, ferric acetate, nickel fluoride, cobalt nitrate; etc., carboxylates of $C_2$–$C_{10}$ acids, e.g., cobalt acetate, cobalt octoate, etc., nickel sulfate, ferric nitrate, etc.

LIGAND

The metal is present in complex association with a biphyllic ligand, i.e., a trihydrocarbyl ligand. The ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these, the phosphines are preferred; however, phosphites, arsines, stibines and bismuthines can also be employed. In general these biphyllic ligands have the following formula:

$$R_1-Y-R_3 \atop R_2$$

wherein:

Y is As, Sb, P, Bi or 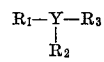;

$R_1$ and $R_2$ are hydrogen, alkyl from 1 to about 8 carbons, aryl from 6 to about 9 carbons or amino, or halo substitution products thereof; and $R_3$ is alkyl from 1 to 8 carbons, aryl from 6 to 9 carbons or

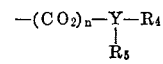

wherein:

$n$ is from 1 to about 6; and $R_4$ and $R_5$ are alkyl from 1 to about 8 carbons or aryl from 6 to about 9 carbons.

Examples of suitable biphyllic ligands useful in my invention to stabilize the catalyst composition are the following:

trimethylphosphine,
trimethylphosphite,
triethylarsine,
triethylbismuthine,
triisopropuylstibine,
chlorodiethylphosphine,
chlorodipropylarsine,
tri(aminobutyl)arsine,
tris(aminoamyl)phosphine,
ethyldiisopropylstibine,
tricyclohexylphosphine,
tri(aminocyclohexyl)stibine,
triphenylphosphine,
triphenylphosphite,
triphenylbismuthine,
tris(N,N-dimethylanilyl)-phosphine,
tris(o-tolyl)phosphine,
triphenylbismuthine,
tris(2-ethylhexyl)arsine,
tris(methylcyclopentyl)stibine,
tris(chlorophenyl)bismuthine,
trianilylbismuthine,
phenyldiisopropylphosphine,
phenyldiamylphosphine,
ethyldiphenylphosphine,
chlorodixylylphosphine,
chlorodiphenylphosphite,
tris(N,N-diethylaminomethyl)phosphine,
ethylene bis(diphenylphosphine), tritolylphosphine,
tricyclohexylphosphite,
tris(methylcyclopentyl)arsine,
tritolylstibine,
hexamethylene bis(diisoproplarsine),
pentamethylene bis(diethylstibine),
diphenyl(N,N-dimethylanilinyl)phosphine,
triphenylanilylethylenediphosphine,
trianilinylphosphine,
tris(3,5-diaminophenyl)phosphine,
trianilinylarsine,
anilinyldiphenylbismuthine,
aminoethyltriisopropylhexamethylenediphosphine,
chlorophenyltriphenylpentamethylenediarsine,
tetraethylethylenedibismuthine,
tetraphenylethylenediphosphite,
tetramethyltrimethylenedistibine, etc.

Of the aforementioned, the aryl phosphines are preferred with Group VIII noble metals because of the demonstrated greater activity of these noble metal catalysts comprising the aryl phosphines while the alkyl phosphines are preferred with the iron group metals, iron, cobalt and nickel because of the greater activity of this combination with the iron group metals.

METAL COMPLEX

As previously mentioned, some of the Group VIII metal-biphyllic ligand complexes are commercially available. Others can be prepared in the manner described in the aforecited copending applications or in the manner described in U.S. Pat. 3,102,899. In the preparation, the metal complex is readily formed upon admixture of the metal, salt, hydride or a complex thereof with a solution of the biphyllic ligand which, preferably, is used in excess of the stoichiometric quantity present in the complex. To obtain various oxidation states of the metal in the complex, oxidizing or reducing treatments can be employed such as treatment of the complex with oxygen or a reducing agent such as hydrogen, carbon monoxide, hydrazine, alkali metal, e.g., sodium, potassium, lithium, etc., dithionites or borohydrides. Preferably the metal is complexed in an elevated valency and its various oxidation states are achieved by treatment with any of the aforementioned reducing agents at a temperature from 25° to about 175° C. and pressures from 1 to about 100 atmospheres, the superatmospheric pressures being preferred with the gaseous reducing agents.

HYDROFORMYLATION REACTION

The invention has particular value in application to the treatment of the high boiling byproduct or residue formed in the hydroformylation reaction. In this reaction an ethylenically unsaturated compound is carbonylated or hydroformylated by contacting it with hydrogen and carbon monoxide in the presence of an inert liquid phase of a non-polar organic solvent containing dissolved quantities of the aforementioned Group VIII metals in complex association with the biphyllic ligand. The olefin, carbon monoxide and hydrogen are contacted with the liquid reaction medium at temperatures from about 20° to about 300° C. and pressures from 1 to about 100 atmospheres. The high boiling tars and byproducts of the reaction accumulate in the reaction medium and are concentrated in the residue remaining from the distillation of the reaction medium in the distillative recovery of the products. The bulk of the distillate residue comprises reaction solvent, catalyst and the accumulated high boiling byproducts and this residue is removed from the distillation zone and recycled to further contacting.

The residue is treated in accordance with my invention by removing from about 1 to about 25 percent of the residue and treating this removed residue to extract the catalyst values therefrom. Prior to extraction of the removed portion of the reaction residue, the residue can be further concentrated by distillation at subatmospheric pressures, e.g., distillation at a temperature from 90° to 225° C. and from 1 to 600 millimeters mercury pressure, preferably from 10 to about 250 millimeters mercury, to remove additional quantities of the reaction solvent which can be returned to the reaction zone. Other treatments that can be employed, particularly when the reaction medium also contains a heterocyclic, polycyclic bridgehead amine, comprise water washing of the reaction solvent prior to the extraction step to extract the basic amine from the reaction residue.

The ethylenically unsaturated compound carbonylated in accordance with my invention can comprise any olefin having from 2 to about 25 carbons; preferably from 2 to about 18 carbons. This olefin has the following structure:

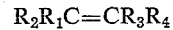

$$R_2R_1C=CR_3R_4$$

wherein $R_1$, $R_2$, $R_3$ and $R_4$ are hydrogen, alkyl, cycloalkyl, aryl, alkaryl, aralkyl, hydroxyalkyl, hydroxyaryl, aminoalkyl or aminoaryl or wherein one of said $R_1$ and $R_2$ and one of said $R_3$ and $R_4$ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-benzylheptene-1, o-vinyl-p-xylene, m-aminostyrene, diethylcyclohexene, decene-1, cycloheptene, cyclooctene, cyclonoene, 4,4'-dimethylnonene-1,dodecene-1, undecene-3, 6-propyldecene-1, tetradecene-2, 7-amyldecene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinylnaphthalene, 1,1-diphenylethylene, allylbenzene, 6 - phenylhexene-1, 1,3 - diphenylbutene-1, 3-benzylheptene-1, o-vinyl-p-xylene, m-aminostyrene, divinylbenzene, 1-allyl-4-vinylbenzene, allylamine, p-aminostyrene, allylaniline, crotonyl alcohol, allylcarbinol, beta-allylethanol, allylphenol, etc. Of the preceding the alpha olefins and olefins having 2 to about 8 carbons are preferred classes.

As previously mentioned a cocatalyst which can be employed with the Group VIII noble metal halide catalyst for the hydroformylation reaction is a poly(heterocyclic) amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine can be used also in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention:

1,2,4-triazabicyclo(1.1.1)pentane;
1,5,6-triazabicyclo(2.1.1)hexane;
5-oxa-1,6-diazabicyclo(2.1.1)hexane;
5-thia-1,6-diazabicyclo(2.1.1)hexane;
2-oxa-1,5,6-triazabicyclo(2.1.1)hexane;
1,2,5,6-tetrazabicyclo(2.1.1)hexane;
5-oxa-1,2,3,6-tetrazabicyclo(2.1.1)hexane;
1-azabicyclo(3.3.1)heptane;
1-azabicyclo(2.2.1)heptane;
1,4-methano-1,1-pyridine;
2-ox-1-azabicyclo(2.2.1)heptane;
1,4-diazabicyclo(2.2.1)heptane;
7-oxa-1-azabicyclo(2.2.1)heptane;
7-thia-1-azabicyclo(2.2.1)heptane;
1,7-diazabicyclo(2.2.1)heptane;
1,3,5-triazabicyclo(2.2.1)heptane;

1-azabicyclo(3.2.1)octane;
1,5-diazatricyclo(4.2.1)decane;
1,7-diazatricyclo(3.3.1.2)undecane;
7-ox-1-azabicyclo(3.2.1)octane;
1,7-diazabicyclo(3.2.1)octane;
3-thia-1,7-diazabicyclo(3.2.1)octane;
1,3,6,8-tetrazatricyclo(6.2.1)dodecane;
2,8-diazatricyclo(7.3.1.1)tetradecane;
1-azabicyclo(3.3.1)nonene, also known as 1-isogranatinine and the oxo, hydroxy and lower alkyl derivatives thereof;
1-azabicyclo(2.2.2)octane also known as quinuclidine as well as the halo, oxo, hydroxy and lower alkyl derivatives thereof;
1-azatricyclo(3.3.1.1)decane;
1,3-diazabicyclo(2.2.2)octane;
1,3-diazabicyclo(3.3.1)nonene;
1,6-diazatricyclo(5.3.1)dodecane;
2-ox-1-azabicyclo(2.2.2)octane;
4,6,10-triox-1-azatricyclo(3.3.1)decane;
1,5-diazabicyclo(3.3.1)nonene;
1,2,5,8-tetrazatricyclo(5.3.1.1)dodecane;
1,4-diazabicyclo(2.2.2)octane also known as triethylene diamine and its oxo, hydroxy, halo and lower alkyl derivatives thereof;
1,3-diazatricyclo(3.3.1.1)decane also known as 1,3-diazadamantane;
1,3,5-triazatricyclo(3.3.1)decane;
1,3,5,7-tetrazabicyclo(3.3.1)nonene also known as pentamethylene tetramine;
1,3,5,7-tetrazatricyclo(3.3.1.1)decane also known as hexamethylenetetramine;
2-oxa-1,3,4-triazabicyclo(3.3.1)nonene;
1-azabicyclo(4.3.1)decane;
1-azabicyclo(3.2.2)nonene;
1,5-diazabicyclo(3.2.2)nonene;
1,3,5,7-tetrazabicyclo(3.3.2)decane;
1,5-diazabicyclo(3.3.3)undecane, etc.

Of the aforementioned poly(heterocyclic)amines having a nitrogen in a bridgehead position the most common and widely known compound is 1,4-diazabicyclo(2.2.2)octane (triethylenediamine) and this material as well as its oxo, hydroxy, halo and lower alkyl derivatives comprises the preferred cocatalyst for use in my process.

EXTRACTION

The reaction residue containing the catalyst metal values is treated in accordance with my invention with the aforementioned strong acid solutions. The amount of the acid solution which is admixed with the residue containing the metal values can be widely varied from about 0.005 volume part to about 100 volume parts of the acid solution per part of residue. Preferably the amount employed is from about 0.01 to about 5 parts of acid solution per part of the residue and, most preferably, from about 0.1 to about 1 part acid solution per part of metal complex solution.

The efficiency of the extraction is improved when the extraction is performed in the presence of a hydrocarbon olefin having from 2 to about 12 carbons. Examples of suitable olefins include the ethylenically unsaturated hydrocarbons such as ethylene, propylene, butene, isobutylene, pentene, hexene, cyclohexene, methylcyclohexene, heptene, cycloheptene, octene, 2-ethylhexene, nonene, decene, isopropylcyclohexene, etc. Preferably the low molecular weight hydrocarbon alkenes having from 2 to about 6 carbons are used as ethylene, propylene, butene, etc. are employed for this purpose. The olefin is employed in an amount between about 10 and about 90, preferably from about 25 to about 50 volume percent of the solvent containing the Group VIII metal catalyst. The treatment pressure can be from 1 to 100 atmospheres or greater. With olefins that are liquid at the treatment temperature and atmospheric pressure, ambient pressure is sufficient. With olefins that are gaseous at the treatment temperatures and atmospheric pressure, superatmospheric pressures within the aforementioned range can be used to maintain solubility of the olefin in the liquid phase.

The extraction is performed at ambient temperatures and is effected by contacting the catalyst residue solution with the acid solution. This can be effected by batch or continuous mixing, e.g., by the introduction of the acid solution into the line through which the residue is withdrawn or by admixing in a separate vessel. The admixed phases are then permitted to clarify or settle so that the non-polar phase can be separated and discarded and the acid phase can be recovered for further treatment, if desired, to recover the metal and ligand values therefrom.

After the phases are separated, the catalyst and excess ligand, if present, can be recovered from the acid solution by dilution of the acid solution with water which precipitates the metal complex and excess ligand from the acid phase. Since the acid solutions of the metal complex are colored, the amount of water to effect precipitation can simply be adjusted to that sufficient to effect decoloring of the acid phase. Generally this amount of water will be from 0.2 to about 10, preferably from about 0.5 to 5 volume parts water per volume part of acid solution.

The dilution of the aqueous acid phase is preferably performed in the presence of any of the aforementioned hydrocarbons or hydroformylation solvents which thereby extract the Group VIII metal complex from the aqueous phase into the solvent phase. This recovery is effected at temperatures similar to that used in the extraction, i.e., from about 0° to about 125° C. and sufficient pressure to maintain liquid phase conditions during the recovery step.

The solvent can be admixed with the aqueous acid solution in an amount from about 100 to about 0.1 volume parts per volume part of the aqueous acid solution; preferably from about 10 to about 50 volume parts per part of the aqueous acid solution so as to extract substantially all the Group VIII metal complex therefrom. This recovery step can likewise be performed continuously or batchwise by injecting the quantities of water to dilute the acid concentration and the non-polar solvent to extract the metal complex from the diluted aqueous acid into contact with the aqueous extract. After admixing of these components, the admixture can be passed to a suitable vessel for clarification or settling of the phases and for separation of the solvent phase which contains the soluble metal biphyllic ligand complex. Preferably the solvent employed is one that is compatible with hydroformylation reaction conditions so that the resulting extract from the recovery step can be supplied directly to the reaction zone to maintain the inventory of catalyst therein.

The invention will now be illustrated by the following specific modes of practice thereof:

EXAMPLE 1

A residue from the hydroformylation of propylene using a rhodium hydride carbonyl tris-triphenylphosphine complex $RhHCO[P(C_6H_5)_3]_3$ as the catalyst is distilled at atmospheric pressure to remove the butyraldehyde product and then distilled under subatmospheric pressure at 1 millimeter mercury and 100° C. to remove the toluene solvent and a substantial portion, 60 to 80 percent, of the heavy residue.

A portion of the residue, 13 grams, is diluted in 140 milliliters of toluene and 135 milliliters of the resulting solution is admixed with 100 milliliters of 75 percent sulfuric acid in water and placed in a ½ gallon stainless steel autoclave. The autoclave is closed and pressured to 600 p.s.i.g. with ethylene and the liquid contents are vigorously stirred for 20 minutes. The stirring is stopped, the liquid permitted to settle for 10 minutes and the lower aqueous phase is withdrawn by a dip tube together with a small sample of the upper toluene phase. The extraction is repeated by charging an additional 100 milliliters of 75 weight percent aqueous sulfuric acid to the autoclave which is pressured to 600 p.s.i.g. with ethylene and the extraction procedure is repeated to recover a second aqueous extract phase and a small sample of the toluene phase.

The samples of the toluene phases and the sample of the toluene solution of catalyst and formylation residue initially charged are analyzed by flame photometry to determine the following rhodium contents:

| Solution: | Milligrams per liter |
|---|---|
| Initial solution | 680 |
| First raffinate | 3.6 |
| Second raffinate | 0 |

An analysis of the samples of raffinates also revealed that only about 40 percent of the high boiling hydroformylation byproducts were extracted into the acid phases.

To 100 milliliters of the first extract phase are added 140 milliliters of toluene containing 1.4 grams of triphenylphosphine. The admixture is diluted with 800 milliliters water and stirred to thoroughly admix the phases and then the phases are permitted to separate into an aqueous phase comprising 900 milliliters and an upper toluene phase comprising 142 milliliters. The lower aqueous phase is sampled and analyzed for rhodium and found to contain 0 milligrams of rhodium per liter, indicating that essentially complete recovery of the rhodium is achieved from the hydroformylation residue.

The extraction is repeated using a solution of 31 grams of the aforementioned hydroformylation residue dissolved in 200 milliliters toluene which is admixed with 20 milliliters 75 percent aqueous sulfuric acid and placed in a pressure bomb that is pressured to 60 p.s.i.g. with ethylene. The solutions are agitated for 15 minutes and then permitted to separate into phase. The lower aqueous phase is removed and a small sample of the toluene phase is removed for rhodium analysis. The extraction procedure is repeated in 5 successive experiments and the percent recovery of the rhodium based on the amount of rhodium present in the charge and raffinate phases subjected to their respective extractions is as follows:

| Extract: | Rhodium recovered |
|---|---|
| First | 83%. |
| Second | 78% of total in first raffinate. |
| Third | 70% of total in second raffinate. |
| Fourth | 0. |
| Fifth | 0. |

The aqueous extracts are admixed with 200 milliliters of toluene containing 1 weight percent triphenylphosphine and 800 milliliters water. The admixed phases are agitated and permitted to settle and in each instance essentially complete extraction of the rhodium complex into the toluene phase is achieved with a single step extraction.

The extraction was repeated by the treatment of 13 grams of the hydroformylation residue dissolved in 130 milliliters of toluene to provide a solution having 908 milligrams of rhodium per liter. To 200 milliliters of the residue solution of toluene were added 75 percent aqueous sulfuric acid and the admixed solutions are stirred for 30 minutes, permitted to settle and the lower aqueous phase is removed together with a sample of the upper phase. The extraction procedure is repeated 5 times and the following table summarizes the recoveries based on analyses of the upper toluene phases using the same basis as previously described:

| Extract: | Rhodium recovered, percent |
|---|---|
| First | 83 |
| Second | 71 |
| Third | 33 |
| Fourth | 0 |
| Fifth | 0 |

The aqueous extracts are admixed with toluene, diluted and essentially complete recovery of the rhodium from the sulfuric acid extract phase is achieved.

The extraction is performed by admixing 50 milliliters of a solution containing 0.5 gram rhodium hydride carbonyl tristriphenylphosphine, 10 milliliters of high boiling residue from the hydroformylation reaction and 6 grams of triphenylphosphine in toluene with an equal volume sulfuric acid solution having 1 part sulfuric acid for 10 parts acetic acid by volume. The solutions are admixed in an autoclave that was closed and pressured to 600 p.s.i.g. with ethylene and the solutions are stirred for 20 minutes in the autoclave, then permitted to separate and the lower aqueous phase is removed together with a small sample of the toluene phase. The extraction procedure is repeated with fresh sulfuric acid extract solution in 4 successive extractions and the analyses of the toluene phane remaining after each extraction reveals the following recoveries of the rhodium reported on the same as the previous basis:

| Extract: | Rhodium recovered |
|---|---|
| First | 97%. |
| Second | 90%. |
| Third | >33%. |
| Fourth | Metal content too low to estimate efficiency. |

EXAMPLE 2

A complex of rhodium hydride carbonyl tris-triphenylphosphine in admixture with hydroformylation high boiling byproducts is extracted with methane sulfonic acid. The extraction is performed by admixing 15 milliliters of 100 percent methane sulfonic acid with 75 milliliters of a solution containing 10 grams of the rhodium complex and 30 grams of triphenylphosphine and 100 milliliters high boiling hydroformylation byproducts, per liter of toluene solvent. The admixed solutions are stirred for 30 minutes at room temperature and then permitted to separate into an aqueous and a toluene phase. The aqueous phase is removed together with a sample of the toluene phase and the toluene phase is analyzed to reveal that it contains 54 milligrams rhodium per liter, a reduction of 96 percent of the rhodium from the initial solution which contained 1300 milligrams rhodium per liter. The aqueous phase is then admixed with 100 milliliters toluene and 500 milliliters water, placed in a rocking bomb, pressured to 5 p.s.i.g. with carbon monoxide and the bomb is rocked for 10 minutes. The solutions are thereafter permitted to settle and the aqueous phase is removed and analyzed to reveal essentially complete rejection of the rhodium complex.

The extraction is repeated by admixing 50 milliliters of the solution of the rhodium complex with 50 milliliters comprising 37.5 milliliters methane sulfonic acid and 12.5 milliliters water. The admixture is placed in a rocking bomb which is closed and maintained under nitrogen while stirring for 30 minutes. The phases are then permitted to separate and the aqueous phase is removed together with a sample of the toluene phase. The extraction is repeated in two successive experiments and the amount of rhodium extracted from its respective hydrocarbon phase in each extraction step is as follows:

| Extract: | Rhodium recovered, percent |
|---|---|
| First | 55 |
| Second | 60 |
| Third | 65 |

The extraction is repeated using 50 milliliters of 50 parts by volume of methane sulfonic acid in 100 parts by volume of acetic acid. The methane sulfonic acid is admixed with 50 milliliters of the solution of the rhodium complex and the admixed solutions are placed in a rocking bomb maintained under nitrogen and stirred for 30 minutes, then are permitted to separate into distinct phases and the acid-rich phase is removed together with a sample of the toluene phase. Analysis for rhodium in the toluene phase reveals that the extraction of the rhodium is 97.5 percent complete.

The extraction is repeated using 50 milliliters of a solution containing 10 parts by volume perchloric acid in 100 parts per volume acetic acid. The perchloric acid solution is admixed with 50 milliliters of the toluene solution of the rhodium complex and the admixed solutions are placed in a rocking bomb, maintained under nitrogen and agitated for 30 minutes. The bomb contents are permitted to separate into distinct phases and the acid phase is removed together with a sample of the toluene phase which is analyzed for rhodium content. The extraction is repeated in 3 successive experiments and the amount of rhodium recovered in each extraction step based on the rhodium content of the respective toluene charge to the extraction step is as follows:

| Extract: | Rhodium recovered, percent |
| --- | --- |
| First | 89 |
| Second | 90 |
| Third | 90 |

The experiment is repeated with a solution of the catalyst, hydroformylation residue and triphenylphosphine using 50 milliliters of a solution containing 10 volume parts of benzene sulfonic acid per 100 volume parts of acetic acid. The extraction is performed on 50 milliliters of the catalyst complex solution and 30 milliliters of hexene-1 is charged to the extraction zone. The extraction in 3 successive steps recovers substantially all the rhodium present in the benzene solution.

The extraction is repeated using 50 milliliters of 35 volume percent cyclohexane sulfonic acid in cyclohexane. The extraction of 50 milliliters of the rhodium containing solution with the acid solution effects greater than 95 percent extraction of the complex.

EXAMPLE 3

The extraction is performed on various complexes using sulfuric acid as the extracting phase. In the first experiment, 100 milliliters of a solution containing 0.052 gram rhodium chlorocarbonyl bis-triphenylphosphine and 1.0 gram triphenylphosphine in tolune are introduced into a rocking mob together with 100 milliliters of 75 weight percent aqueous sulfuric acid. The bomb is closed and pressed to 600 p.s.i.g. with ethylene and stirred for 30 minutes. The liquid contents of the bomb are then permitted to separate into distinct phases and the lower phase together with a sample of the upper phase is withdrawn. The sample is analyzed for rhodium content and found to contain 1.5 percent of the rhodium in the initial charge revealing that the aqueous acid extracts 98.5 percent of the rhodium in the original charge.

The extraction is repeated using 100 milliliters of a toluene solution containing 0.2 gram of a rhodium chlorocarbonyl bis-triphenylarsine catalyst. The toluene solution is admixed with 10 milliliters of 75 weight percent aqueous sulfuric acid and placed in a rocking bomb and maintained under nitrogen while stirring for 5 to 10 minutes. Upon completion of the period, the phases are permitted to settle and the aqueous phase is removed together with a sample of the toluene phase. The recovery of rhodium into the acid was comprised of 60 percent of the rhodium in the original solution.

The extraction is repeated with the addition of 80 milliliters hexene-1 and the phases are stirred for 30 minutes in the rocking bomb. The phases are permitted to separate, the aqueous phase and a sample of the toluene phase are removed and analyzed to reveal that the extraction in the presence of hexene-1 recovers 75 percent of the rhodium from the toluene phase.

The extraction is performed with 200 milliliters of a solution containing 2025 milligrams of rhodium per liter as a rhodium chlorocarbonyl bis-tri-n-butylphosphine complex. To the toluene solution is added 20 milliliters of 75 weight percent aqueous sulfuric acid and the admixed phases are stirred for 30 minutes in a rocking bomb, then permitted to separate and the lower aqueous phase is removed together with a sample of the toluene phase. Analysis of the toluene phase revealed that 80 percent of the rhodium was extracted by the aqueous sulfuric acid.

EXAMPLE 4

The experiments are repeated using sulfuric acid solutions in various anhydrous solvents. In the first experiment 100 milliliters of a solution containing 66 milligrams of rhodium per liter as the rhodium hydride carbonyl triphenylphosphine complex in toluene is admixed with 100 milliliters of a solution comprising 8 parts by volume concentrated sulfuric acid and 10 parts by volume of ethyl acetate. The admixed phases are stirred for 10 minutes in a rocking bomb under nitrogen, then permitted to separate and the lower aqueous phase is removed with a sample of the toluene phase. Analysis of the toluene phase reveals that the extraction removed 98.5 weight percent of the rhodium complex from the toluene phase.

The experiment is repeated by the admixing of 100 milliliters of the aforementioned rhodium containing solution and a solution containing 50 milliliters concentrated sulfuric acid in 100 milliliters dimethylsulfoxide. The admixed phases are stirred for 15 minutes in a rocking bomb under nitrogen, then permitted to separate and the lower aqueous phase is removed together with a sample of the toluene phase. Analysis of the toluene sample reveals that the extraction removed 78 percent of the rhodium complex in the toluene solution charged to the rocking bomb.

The experiment is repeated using 100 milliliters of the aforementioned rhodium complex containing solution to which is added a solution of 18 milliliters concentrated sulfuric acid in 100 milliliters dimethylformamide. The extraction effects a removal of 73 percent of the rhodium contained in the toluene solution.

The experiment is repeated by admixing 50 milliliters of a toluene solution containing 180 milligrams rhodium per liter as the rhodium chlorocarbonyl bis-triphenylphosphine complex with 50 milliliters of a solution comprising 2 parts by volume concentrated sulfuric acid and 10 parts by volume of anhydrous actic acid. The phases are admixed for 10 minutes in a rocking bomb under nitrogen, then permitted to separate and the lower aqueous phase is removed together with a sample of the toluene phase. Analysis of the toluene phase reveals that the extraction removed 67 percent of the rhodium in the toluene phase.

EXAMPLE 5

The extraction is repeated on complexes of various Group VIII metals. In a first experiment 90 milliliters of toluene containing 0.9 gram of the cobalt carbonyl complex with tri-n-butylphosphine and 1.8 milliliters excess tri-n-butylphosphine are admixed with 10 milliliters of 75 weight percent aqueous sulfuric acid. The admixed phases are placed in a rocking bomb, maintained under nitrogen and stirred for 30 minutes. The phases are permitted to separate and the lower aqueous phase together with a sample of the toluene phase are removed and the toluene phase sample is analyzed to determine the rhodium content. The analysis reveals that the recovery of the cobalt is 97 percent complete in the extraction.

The extraction is repeated with 50 milliliters of a toluene solution containing 0.26 gram iridium hydride carbonyl tris-triphenylphosphine and 0.5 gram triphenylphosphine. The iridium containing solution is admixed with 50 milliliters of 75 weight percent aqueous sulfuric acid in a rocking bomb, the bomb is closed and the contents maintained under nitrogen while stirring for 30 minutes. The phases are permitted to separate and the lower aqueous phase together with a sample of the toluene phase are removed and the sample of the toluene phase is analyzed to reveal that the sulfuric acid extracted 20 percent of the iridium in the toluene solution.

The extraction of the aforementioned iridium containing solution is repeated, however the extraction is performed in the presence of 50 milliliters of hexene-1. The analysis of the toluene phase remaining after the extraction revealed that the aqueous sulfuric acid removed 85 percent of the iridium present in the toluene phase.

The extraction is repeated by admixing 100 milliliters of a heptane solution containing 0.3 gram of a complex of palladium chloride and tri-tolyl bismuthine. The heptane solution is admixed with 50 milliliters of 75 weight percent aqueous sulfuric acid and 30 milliliters of nonene-1 and the extraction procedure is repeated to recover substantially all of the palladium present in the heptane solution.

The extraction is repeated by charging 120 milliliters of a xylene solution of platinum nitrate complex with tri-n-propylstibine with 35 milliliters of 75 weight percent aqueous sulfuric acid and 15 milliliters of octene-1. The extraction effects a substantial recovery of the platinum from the xylene solution.

In the preceding Examples 1-5, whenever the extraction is performed on solutions which contain an excess of the biphyllic ligand, i.e., amount greater than that amount in the complex, essentially complete extraction (98-100%) of the ligand into the acid phase is effected. Similarly complete precipitation of the ligand from the acid phase is effected upon dilution of the acid phase. When the extraction is performed on solutions which also contain tar and high-boiling hydroformylation byproducts, the amount of these byproducts that is extracted into the acid phase varies from 40 to 60 weight percent.

The preceding examples are intended solely to illustrate the mode of practice of the invention and to demonstrate results obtainable thereby. It is not intended that these examples be interpreted as unduly limiting of the invention, but rather that the invention be defined by the steps and reagents and their obvious equivalents set forth in the following claims:

What is claimed is:

1. The separation of Group VIII noble metal values from an organic solution containing a soluble complex between a Group VIII noble metal and a biphyllic ligand having the following formula:

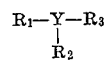

wherein:

Y is As, Sb, P, Bi or $P(O)_3$ $R_1$ and $R_2$ each represent hydride, an alkyl or aminoalkyl having from 1 to 8 carbons, a cycloalkyl or aminocycloalkyl having from 5 to about 9 carbons or an aryl or aminoaryl having from 6 to 9 carbons;

$R_3$ is an alkyl having from 1 to 6 carbons, an aryl having from 6 to 8 carbons or a univalent radical having the following formula:

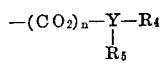

wherein:

$n$ is a whole number from 1 to 6;

$R_4$ and $R_5$ each represent an alkyl having from 1 to 8 carbons or an aryl having from 6 to 8 carbons;

which comprises admixing said organic solution with from 0.005 to 100 volumes per volume of organic solution of an acid solution comprising a solvent and an acid selected from the class consisting of perchloric, sulfuric and alkyl sulfonic acids having from 1 to about 6 carbons, cycloalkyl sulfonic acids having from 5 to about 8 carbons and monocyclic aryl sulfonic acids having from 6 to about 10 carbons and having a concentration greater than about 5 weight percent and sufficient when admixed with a toluene solution containing said noble metal complex to effect a decolorization of said solution; said solvent being inert to said acid, complex and organic solution and having sufficient solvency for said acid to render said acid solution immiscible with said organic solution so that a phase separation occurs between said acid solution and said organic solution; and permitting the resultant mixture of said organic solution and acid solution to form distinct phases.

2. The method of claim 1 wherein said complex is a complex of rhodium.

3. The method of claim 1 wherein Y is phosphorus.

4. The method of claim 1 wherein said acid is sulfuric acid.

5. The method of claim 4 wherein said complex is a rhodium triphenylphosphine complex.

6. The method of claim 1 wherein said solvent is water and wherein said acid is sulfuric acid at a concentration in said acid solution of from 60 to 70 weight percent.

7. The method of claim 1 wherein said distinct phases are separated to recover said acid solution phase.

8. The method of claim 7 wherein the separated phase comprising said acid solution is diluted by the addition of sufficient water thereto to reduce the concentration of the acid to less than 5 weight percent and to precipitate said metal complex from said acid solution and wherein said acid solution is contacted with an organic non-polar solvent to extract said precipitated metal complex therefrom.

9. The method of claim 1 wherein said organic solution is from 1 to about 25 percent of the reaction medium employed in a hydroformylation reaction using said metal complex as a homogeneous catalyst.

10. The separation of Group VIII metal values from an organic solution containing a soluble complex between a Group VIII metal selected from the class consisting of iron, cobalt and nickel and a biphyllic ligand having the following formula:

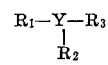

wherein:

Y is As, Sb, P, Bi or $P(O)_3$;

$R_1$ and $R_2$ each represent hydride, an alkyl or aminoalkyl having from 1 to 8 carbons or a cycloalkyl or aminocycloalkyl having from 5 to about 9 carbons;

$R_3$ is an alkyl having from 1 to 6 carbons, an aryl having from 6 to 8 carbons or a univalent radical having the following formula:

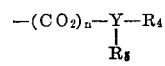

wherein:

$n$ is a whole number from 1 to 6;

$R_4$ and $R_5$ each represent an alkyl having from 1 to 8 carbons;

which comprises admixing said organic solution with from 0.005 to 100 volumes per volume of organic solution of an acid solution comprising a solvent and an acid selected from the class consisting of perchloric, sulfuric and alkyl sulfonic acids having from 1 to about 6 carbons, cycloalkyl sulfonic acids having from 5 to about 8 carbons and monocyclic aryl sulfonic acids having from 6 to about 10 carbons and having a concentration greater than about 5 weight percent and sufficient when admixed with a toluene solution containing said complex to effect a decolorization of said toluene solution; said solvent being inert to said acid, complex and organic solution and having sufficient solvency for said acid to render said acid solution immiscible with said organic solution so that a phase separation occurs between said acid solution and said organic ganic solution and acid solution to form distinct phases.

11. The method of claim 1 wherein said Group VIII noble metal is selected from the group consisting of rhodium, iridium, palladium and platinum.

12. The method of claim 10 wherein said solvent comprises water.

13. The method of claim 1 wherein said organic solution and said acid solution are admixed in the presence of a hydrocarbon olefin having between 2 and about 12 carbons and at a pressure of between 1 and 100 atmospheres and sufficient to maintain liquid phase conditions.

14. The method of claim 10 wherein said organic solution and said acid solution are admixed in the presence of a hydrocarbon olefin having between 2 and 12 carbons and at a pressure of between 1 and 100 atmospheres and sufficient to maintain liquid phase conditions.

15. The method of claim 1 wherein Y is arsenic or phosphorus.

16. The method of claim 10 wherein Y is arsenic or phosphorus.

17. The method of claim 10 wherein said distinct phase of acid solution is separated from the organic solution and is distilled by the addition of sufficient water thereto to reduce the concentration of the acid therein to less than 5 weight percent and sufficient to precipitate said metal complex from said acid solution and wherein the acid solution is contacted with a non-polar solvent to extract said metal complex therefrom.

18. The method of claim 1 wherein said organic solution is a high-boiling residue stream from a hydroformylation reaction.

19. The method of claim 18 wherein said residue stream contains high-boiling hydroformylation byproducts.

20. The method of claim 10 wherein said organic solution is a high-boiling residue stream from a hydroformylation reaction.

21. The method of claim 20 wherein said residue stream contains high-boiling hydroformylation byproducts.

References Cited

UNITED STATES PATENTS 3,420,873    1/1969    Olivier _____ 260—497

OTHER REFERENCES

Davison et al., J. Chem. Soc., 1962, pp. 3653–5, 3658–66.

JAMES E. POER, Primary Examiner

A. P. DEMERS, Assistant Examiner

U.S. Cl. X.R.

252—415, 429 R, 431 P; 260—239 B, 244 R, 248 R, 250 R, 269, 298, 307 R, 308 R, 309, 313.1, 439 R, 497 A, 533 R, 604 HF